Jan. 30, 1940.   R. M. DAUGHERTY ET AL   2,188,427
AUTOMOTIVE ANTENNA EQUIPMENT
Filed July 18, 1938
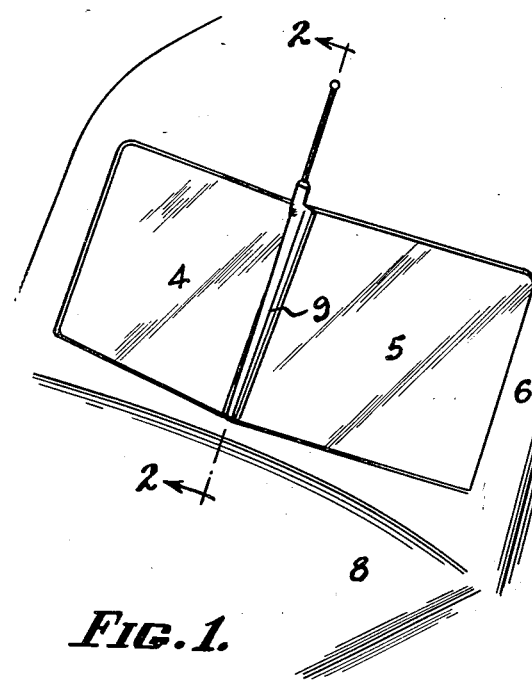
FIG.1.
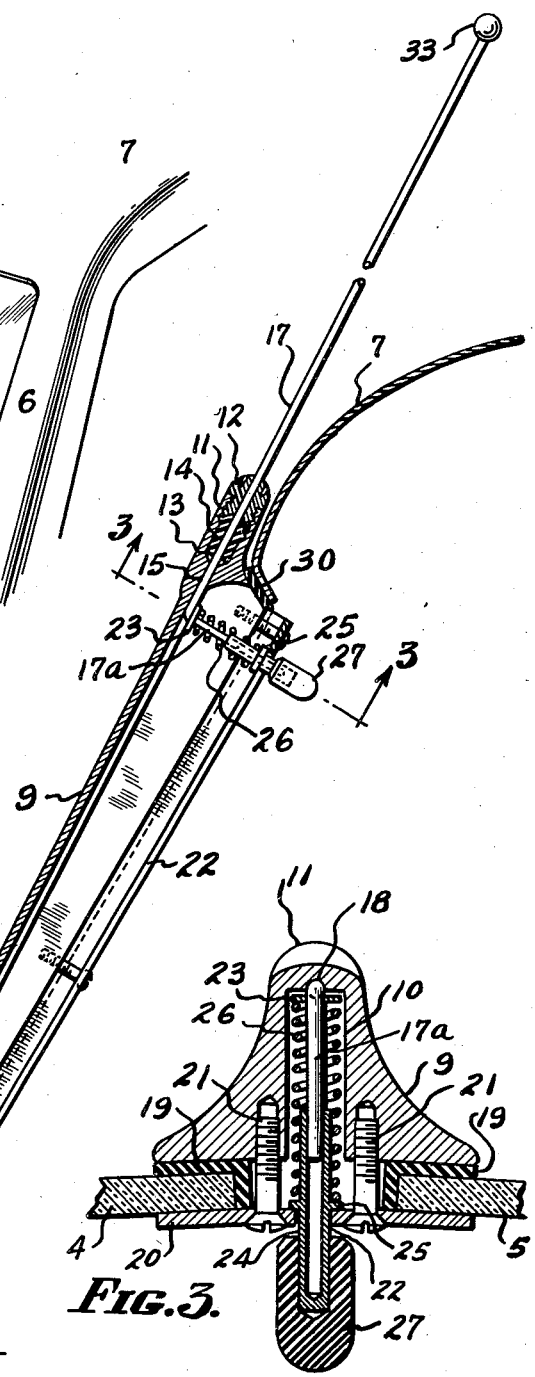
FIG.2.
FIG.3.
INVENTORS.
ROGER M. DAUGHERTY
BY AND WILLIAM H. MYERS.
Allen & Allen
ATTORNEYS.

Patented Jan. 30, 1940

2,188,427

UNITED STATES PATENT OFFICE 2,188,427

AUTOMOTIVE ANTENNA EQUIPMENT

Roger M. Daugherty, Cincinnati, Ohio, and William H. Myers, Detroit, Mich., assignors to The Crosley Corporation, Cincinnati, Ohio, a corporation of Ohio Application July 18, 1938, Serial No. 219,690

9 Claims. (Cl. 250—33)

Our invention relates to antennae for automobile radios and the like, and in particular to antennae of the "whip" type which in use project above the body of the car. The use of all metal or so called "turret tops" in motor vehicles has brought about the use either of under-car antennae which have certain disadvantages, or the whip type antennae which also have certain disadvantages, though providing a better pick-up and less noise under many conditions of operation. There are obvious difficulties with whip-type antennae from the standpoint of appearance, clearance, and maintenance; and many of them are so placed as to be distinctly in the way.

The fundamental objects of our invention are the elimination of the former difficulties and disadvantages of the whip-type antenna. Ancillary objects are the provision of an antenna structure which, while highly efficient, is self-contained, adjustable as to height, operable from within the vehicle, is attractive in appearance, and forms an integral part of the vehicle. Other objects will be pointed out hereinafter or will be apparent to one skilled in the art upon reading these specifications; and these objects we accomplish by that certain construction and arrangement of parts of which we will now set forth an exemplary embodiment.

Reference is made to the drawing, wherein:

Fig. 1 is a perspective view of a front upper portion of a vehicle with our device forming a part thereof.

Fig. 2 is a vertical longitudinal section of the antenna device and adjacent portions of the vehicle, taken along the lines 2—2 of Fig. 1.

Fig. 3 is a transverse section of the device taken along the lines 3—3 of Fig. 2.

In the practice of our invention, we mount an antenna structure of adjustable character on or as a part of the windshield in a motor vehicle. In many motor vehicles the windshield is divided into two parts which lie at an angle to each other, and intermediate these parts is a rib forming part of the car body to which the two portions of glass are attached. Our invention is not limited in this respect since it is clearly applicable to vehicles having a windshield all portions of which lie in the same plane. Such windshields may be divided, and the device of our invention mounted thereon as indicated. Also, as will hereinafter be set forth, modifications may be made in our invention to adapt it to different types of motor vehicles.

In the particular embodiment which we shall describe, the antenna structure forms a rib at the adjacent edges of panes of glass which form the windshield of the vehicle. The antenna comprises a rod which is slidably mounted in the bar or division member, which is preferably operable from within the vehicle, and which can be raised or lowered as required.

In Fig. 1 we have indicated the upper front portion of a motor vehicle comprising a windshield in two parts, 4 and 5, mounted, as usual, in the front portion 6 of a vehicle having a turret top 7 and a hood 8. As division means between the glass members 4 and 5, we provide a member 9 which in external appearance is not unlike the ordinary rib forming the division means down the center of a windshield.

The construction of the member 9 and its component parts is illustrated in Figs. 2 and 3. The member 9 is a member of normal shape, suitable for the structural use to which it is put in the automobile. Ordinarily it will be thicker at the top than at the bottom in order to clear the turret 7, and for decorative reasons. The exact shape of the member is not a limitation upon our invention. The member in the embodiment illustrated is of metal, and it is grooved centrally as at 10. At the top it is preferably carried beyond the line of the glass and is provided with a threaded nipple into which a perforated plug 12 may be threaded. The bore in the nipple is carried below the plug as at 13 to provide space for a packing 14; and therebeyond it is perforated as at 15 to provide easy passage for a rod 17 which is the "whip" of the antenna. The construction thus far described as comprising elements 11 to 15 inclusive, forms a gland through which the rod 17 may move longitudinally but which prevents the ingress of water.

At the bottom of the groove 10, we may provide a shallower groove 18 to accept the rod 17 and to guide it in its movements.

The member 9, as has been indicated, forms a mullion for the glasses of the windshield. These glasses 4 and 5 may be provided with bushings of rubber or other suitable material indicated at 19. A plate 20 completes the mullion structure. The plate is held at intervals to the member 9 by bolts 21, passing between the glasses 4 and 5.

The plate 20 is slotted centrally, as indicated at 22, to provide a passage for an operating member. The end of the rod 17 is bent over as at 17a, and is provided with a washer 23. A tubular sleeve member 24 is slipped over the end 17a of the rod. This member is provided with a flange or washer 25, and a coiled spring 26 engages between the washer 23 on the rod and the washer or flange 25 on the sleeve. The coiled spring acts to keep the washer or flange 25 pressed tightly against the plate 20. The end of the sleeve 24 which projects through the plate 20 may be provided with an operating handle 27.

At the top and bottom of the windshield where the member 9 would otherwise come against the cowling 28, the instrument panel member, or the turret top 7 of the vehicle, insulating material 29 and 30 is interposed therebetween, so that the member 9 is out of electrical contact with the metal parts of the vehicle. An aerial lead 31 from the radio set (not shown) may be attached directly to the member 9, as at 32. The member 9 and the rod 17 act together as an antenna for the radio set. The rod may be topped with an ornamental ball 33 or other ornament, if desired. For use on the open road the rod 17 may be run upwardly by elevating the operating handle 27, as will be clear, the construction including the spring 26 compensating for the varying thickness of the member 9. The rod 17 will normally be of such length that when it is drawn down as far as possible, there will still be some safe projection above the top of the vehicle. When the operating handle 27 is in its uppermost position, the effective height of the rod will be increased by a length substantially equivalent to the depth of the windshield.

It will be clear that modifications may be made in our invention without departing from the spirit of it. For example, the member 9 may be made of insulating substance in which event it can be bolted or otherwise attached to the turret top 7, the cowling 28 and/or the instrument panel member 34. When this is done the antenna lead 31 may be attached to the plate 20, which plate will be carefully insulated from metallic parts of the vehicle. Also where operation from within the vehicle can be dispensed with, and in particular where the windshield is imperforate and unitary, a slight modification of our device may be made so that it can be operated from outside the vehicle, and so that it can be attached to the glass of the windshield.

Having thus described our invention, what we claim as new and desire to secure by Letters Patent is:

1. As an antenna structure for an automotive vehicle, a mullion for a windshield electrically insulated from metallic parts of said vehicle, an antenna rod slidable in said mullion, and means operable from within the vehicle for sliding said antenna rod.

2. As an antenna member for an automotive vehicle, a mullion for a windshield, a rod slidably mounted in said mullion, means within the vehicle for attaching said mullion to the windshield in electrically insulative relation to metallic parts of said vehicle, and operating means for said rod extending through said last mentioned means.

3. As an antenna structure for an automotive vehicle, a metallic mullion for a windshield, a rod slidable in said mullion, means for mounting said mullion on a windshield and out of electrical contact with metallic members of said vehicle, and means for making connection with an antenna lead from a radio set to said mullion.

4. As an automotive antenna, a metal member having a groove in one side thereof and perforated at one end, a rod sliding in said perforation, the lower end of said rod being bent at an angle, a second metallic member connected to the first, said second member being slotted, an operating handle, means extending through said slot, said handle means having a sleeve portion engaging the bent-over portion of said rod, and a coil spring surrounding the bent-over portion of said rod and said sleeve portion, for forcing respectively said rod against said first mentioned member and said operating means against said second metallic member.

5. In combination in an automotive vehicle, a windshield in two parts, a mullion member for said windshield covering the adjacent edges of said parts and lying against said windshield on one side, said mullion being electrically insulated from metallic parts of said vehicle, a slotted plate lying against said windshield on the opposite side, connection means between said mullion and said plate, said mullion having a groove therein, and a rod slidable in said groove and extending above said mullion.

6. In combination in an automotive vehicle, a windshield in two parts, a mullion member for said windshield covering the adjacent edges of said parts and lying against said windshield on one side, said mullion being electrically insulated from metallic parts of said vehicle, a slotted plate lying against said windshield on the opposite side, connection means between said mullion and said plate, said mullion having a groove through which said rod is longitudinally slidable.

7. In combination in an automotive vehicle, a windshield in two parts, a mullion member for said windshield covering the adjacent edges of said parts and lying against said windshield on one side, said mullion being electrically insulated from metallic parts of said vehicle, a slotted plate lying against said windshield on the opposite side, connection means between said mullion and said plate, said mullion having a groove therein, a rod slidable in said groove and extending through said mullion, said mullion having a gland through which said rod is longitudinally slidable, an operating member slidable in said plate and a connection between said operating member and said rod.

8. In combination in an automotive vehicle a windshield in two parts, a mullion member for said windshield covering the adjacent edges of said parts and lying against said windshield on one side, said mullion being electrically insulated from metallic parts of said vehicle, a slotted plate lying against said windshield on the opposite side, connection means between said mullion and said plate, said mullion having a groove therein, a rod slidable in said groove and extending through said mullion, said mullion having a gland through which said rod is longitudinally slidable, an operating member slidable in said plate and a connection between said operating member and said rod, said operating connection comprising a bent-over portion of said rod, a sleeve portion of said operating member surrounding said bent-over portion of said rod, abutment means on said rod and said operating member, said last mentioned abutment means engaging said plate, and a compression spring located between said abutment means.

9. In an automotive antenna device, a windshield mullion of generally triangular shape, said mullion having a central slot and being perforated at the top, said mullion being electrically insulated from metallic parts of said vehicle, a rod forming a whip antenna slidably mounted in said perforation and in said slot, a plate, means for attaching said plate to said first mentioned member, operating means slidably mounted in a slot in said plate, a connection between said rod and said operating means, and means for making electrical contact to said rod through at least one of the aforementioned elements.

ROGER M. DAUGHERTY.
WILLIAM H. MYERS.